United States Patent [19]

Aluotto et al.

[11] 4,222,919

[45] Sep. 16, 1980

[54] AQUEOUS ORGANIC COATINGS FOR METAL SURFACES

[75] Inventors: Patrick F. Aluotto; Paul A. Drees, both of Cincinnati, Ohio

[73] Assignee: Inmont Corporation, New York, N.Y.

[21] Appl. No.: 972,116

[22] Filed: Dec. 20, 1978

[51] Int. Cl.$^2$ .................... C08G 63/18; C08G 63/52; C08L 63/02; C08L 67/00

[52] U.S. Cl. ................... 260/29.4 R; 260/29.2 E; 260/29.2 EP; 528/104; 528/110; 528/115; 528/194

[58] Field of Search ............ 528/104, 110, 296, 297, 528/115, 194; 260/29.4 R, 29.2 E, 29.2 EP

[56] References Cited

U.S. PATENT DOCUMENTS

| | | | |
|---|---|---|---|
| 3,424,817 | 1/1969 | Hicks | 528/110 |
| 3,600,459 | 8/1971 | Vasta | 528/297 |
| 3,844,998 | 10/1974 | Jeffrey et al. | 260/29.4 R |
| 3,985,695 | 10/1976 | Tobias et al. | 528/115 |
| 4,088,619 | 5/1978 | Holzrichter | 260/29.4 R |
| 4,098,735 | 7/1978 | Tobias | 260/22 EP |
| 4,098,744 | 7/1978 | Allen et al. | 260/29.4 R |
| 4,105,614 | 8/1978 | Davis et al. | 260/29.4 R |
| 4,115,473 | 9/1978 | Downs | 260/29.4 R |
| 4,141,871 | 2/1979 | Shimp et al. | 260/29.4 R |
| 4,148,772 | 2/1979 | Marchetti et al. | 528/110 |
| 4,151,305 | 4/1979 | Davis et al. | 528/104 |

*Primary Examiner*—Allan Lieberman
*Attorney, Agent, or Firm*—Michael R. Chipaloski; F. W. Wyman

[57] ABSTRACT

Aqueous coating compositions for metal surfaces that exhibit superior steam processibility. The coating compositions comprise:
 (1) a water-reducible polyester resin and
 (2) a water-soluble cross-linking agent.

6 Claims, No Drawings ns
AQUEOUS ORGANIC COATINGS FOR METAL SURFACES

BACKGROUND OF THE INVENTION

1. Field of the Invention

This invention relates to the coating of metal articles and more particularly to coating metal articles, i.e., metal cans, with an aqueous solution of water reducible polyester resins that exhibit superior steam processibility.

2. The Prior Art

In the manufacture of metal containers, a protective synthetic resin coating may be applied to the exterior and interior of the container. The synthetic resins which are employed for coating the metal container are generally heat-curable, resinous materials which are applied in the form of a solution or dispersion in a volatile organic solvent. The wet-coated metal surface is passed through an oven in which hot air is circulated to evaporate the solvent and to cure the coating material to the required hardness. The removal of the organic solvent can create an air pollution problem.

Among the various methods which have been proposed to avoid the use of organic solvents in preparing synthetic resin coatings for metal surfaces is to formulate the coating in a water soluble composition.

Aqueous dispersions of polymers having reactive carboxylic acid groups and heat curable, thermosetting resins have been proposed by the art as metal coatings, e.g. U.S. Pat. No. 2,902,390, U.S. Pat. No. 2,954,358, U.S. Pat. No. 3,053,693, U.S. Pat. No. 3,094,435, U.S. Pat. No. 3,378,477, U.S. Pat. No. 3,403,088, U.S. Pat. No. 3,466,347 and U.S. Pat. No. 3,904,569. These coating materials have not found wide commercial application in the container industry as many of these coatings are not sufficiently inert to the packaged product, or suffer from loss of properties when the metal is fabricated or the can is steam processed or pasteurized.

We have now found novel polyester coating compositions that maintain the good properties of fabrication and steam processibility without loss of coating properties (i.e., adhesion, appearance).

SUMMARY OF THE INVENTION

The coating compositions of the present invention comprise an aqueous solution of (1) a water reducible polyester which is the esterification reaction product of:
  (A) a resinous polyol made by reacting one mole of an epoxy resin containing two epoxide groups per molecule with two moles of a bisphenol;
  (B) a monomeric polyol containing 2 to 4 hydroxyl groups and 2 to 8 carbon atoms;
  (C) alkanoic acids or mixtures thereof containing 2 to 18 carbon atoms;
  (D) polycarboxylic acid(s)
wherein (A) and (B) are reacted with (C) and the resulting product is then reacted with (D) and said polyester is soluble in water as its alkali or amine salt and (2) a water soluble cross-linking agent. A preferred weight ratio of polyester to cross-linking agent is from about 90/10 to about 70/30. The coating compositions are suitable as can linings and in particular exhibit superior steam processibility.

DESCRIPTION OF THE INVENTION

The novel coating compositions of this invention comprise an aqueous solution of (1) a water reducible polyester which is the esterification reaction product of:
  (A) a resinous polyol made by reacting one mole of an epoxy resin containing two epoxide groups per molecule with two moles of a bisphenol;
  (B) a monomeric polyol containing 2 to 4 hydroxyl groups and 2 to 8 carbon atoms;
  (C) alkanoic and alkenoic acids or mixtures thereof containing 8 to 18 carbon atoms;
  (D) polycarboxylic acid(s)
wherein (A) and (B) are reacted with (C) and the resulting product is then reacted with (D) and said polyester is soluble in water as its alkali or amine salt, and (2) a water soluble cross-linking agent. A preferred weight ratio of polyester to cross-linking agent is from about 90/10 to about 70/30.

Advantageously, the resinous polyol starting material is prepared by the reaction of a conventional liquid epoxy resin, (Epons, DER, Araldite and Epi-Rez resins are suitable commercial resins) with a monomeric dihydric phenol such as a bisphenol in such ratios that there are two phenolic hydroxyl groups for each epoxide group of the liquid epoxy resin. Certain catalysts well known to the art which catalyze the opening of the oxirane or epoxide ring will promote the desired reaction. One can add these catalysts to commercial liquid epoxy resins (i.e., DER 331 or Epon 828). It is also possible, and in many cases preferred, to use an epoxy resin which contains a catalyst (i.e., DER 333 or Epon 829).

Epoxy resins are conventionally prepared by reacting a polyhydric phenol, especially bisphenol, with epichlorohydrin in the presence of alkali, the ratio of epichlorohydrin to bisphenol being adjusted to the desired molecular weight of resinous product.

The epoxy-polyols that are used in the present invention can be made starting with bisphenol and epichlorohydrin provided the bisphenol is used in excess, i.e., in such ratios that the polymeric chain will terminate in a phenolic group rather than the epoxide group or, in an alternative method, a conventional epoxy can be reacted with an excess of a bisphenol. A preferred ratio is two moles bisphenol per one mole epoxy resin. Typically the molecular weight would range from 480–520.

4,4'isopropylidene diphenol is a useful phenol according th this invention. Other monomeric polyhydric phenols can, of course, be used. In fact, we especially prefer to use "Bisphenol A" which is a commercial product consisting predominantly of the 4,4'-isomer.

The resulting epoxy-polyol product has an oxirane content on the order of 0% and at least 4 hydroxyls/mole.

The epoxy-polyol can then be used in the preparation of a polyester by substitution of a portion of the glycol content of a standard polyester with the epoxy-polyol of the present invention. In converting from a polyester lacking steam processibility to one possessing the quality, a preferred amount of the epoxy-polyol is about 50 weight % of the glycol typically used in preparing the polyester. However, the practical amount would depend on solids/viscosity requirements of the coating and the other constituents contained in the polyester. Any of the conventional water based, high solids, solvent based polyesters and oil modified polyesters can be used according to the present invention. An equivalent weight basis amount of the epoxy-polyol in place of the glycol is used in the modification of such polyesters. The acid number in the final product is typically from about 20 to about 80 and preferably from 50 to 55.

A water reducible oil modified polyester is typically made by conventional techniques and is preferably polyesterified using a fatty acid such as safflower, soya or coconut oil fatty acids with a dicarboxylic acid such as terephthalic, isophthalic, adipic, fumaric, etc., and an acid anhydride, a monomeric glycol or polyol such as neopentyl glycol, diethylene glycol, trimethylol propane, pentaerythritol, etc., in a solvent such as an alcohol, glycol ethers, glycol ether esters, ketones, esters, etc.

The oil modified polyester utilized in preparing the novel coating composition of this invention is then reacted with a primary, secondary or preferably a tertiary amine, i.e., dimethylaminoethanol, trimethylamine, etc.; to render the polyester water dispersible or water soluble.

The solubilized polyester is then blended with a cross-linking agent. Suitable water-soluble cross-linking agents include the so-called amino resins or aminoplasts containing —NH$_2$ groups derived from urea and melamine. Suitable amino-containing resins are prepared by reacting urea or melamine with formaldehyde under well-known conditions to form a reaction monomer first and then, by condensation polymerization, a large number of varying types of polymeric intermediates are formed. The preparation of urea-formaldehyde and melamine-formaldehyde resins is well-known in the art and forms no part of the present invention. Accordingly, a large number of amino-plast resins, i.e., urea-formaldehyde and melamine-formaldehyde resins, are commercially available under such trade designations as Plaskon, Beetle, Cymel, Fiberite, Resimene, Curacron and Backamine, among many others.

Preferred cross-linking agents include the melamine formaldehyde resins. Especially preferred water-soluble cross-linking agents are the hexamethoxy methylmelamines marketed under the trade designations of CYMEL ® and RESIMENE ®.

The coating compositions of the present invention can be satisfactorily applied to metal surfaces by any of the conventional methods employed by the coating industry. For general coating purposes, roll, rinse, spray, and flow coating are useful methods of application. After applying the coating, the applied coating is cured by heating the coated metal substrate at a temperature of about 350° to about 450° F. for a period of about 1 to 10 minutes.

The preferred coating weight for coating metal containers with the polyester coating of the present invention is in the range of from about 3 to about 6 milligrams of resin coating per square inch of exposed metal surface.

The present invention is illustrated, but not limited, by the following examples.

EXAMPLE I

An epoxy-polyol was made by reacting one mole of the epoxy resin Epon 829 with 2 moles of Bisphenol A. The reaction was carried out at 380° F. until a weight/epoxy of ∞ was obtained. At this point, the epoxy-polyol has approximately 4 hydroxyls/mole. The product was cast into sheets and then pulverized.

EXAMPLE II

A water reducible oil modified polyester was made by polyesterifying the fatty acid of safflower oil, isophthalic acid and trimellitic anhydride with diethylene glycol. The polyesterification was carried out to acid number 50 and quenched with glycol ether. The polyester was then solubilized by addition of an amine and reduced to a non-volatile level with water.

EXAMPLE III

The oil modified polyester of Example II was modified by replacing 50% of the glycol content with equal equivalence of epoxy polyol from Example I. The substitution was made on an equivalent weight bases. The polyesterification was carried out and the product solubilized as in Example II. The solubilized product was formulated into a clear coating by reaction with Cymel 303 and the resultant coating composition, when applied by roller coater to tinplate at 3–4 mg/square inch of tinplate, was able to withstand steam processing at 250° F. and 15 psi for 30 minutes without loss of physical properties.

EXAMPLE IV

Comparative Example

The water based oil modified polyester of Example II was formulated into a clear coating by crosslnking with Cymel 303 and coated onto tinplate by roller coater to give a coating of 3–4 mg/square inch of tinplate. When exposed to steam in a retort at 250° F. and 15 psi for 30 minutes, the coated surface softened and blushed and was therefore not suitable as a coating for containers.

EXAMPLE V

A water reducible polyester was prepared from the following:

|   |   | Weight |
|---|---|---|
| 1. | Pelargonic Acid | 18.18% |
| 2. | Neopentyl Glycol | 33.73 |
| 3. | Isophthalic Acid | 6.70 |
| 4. | Trimellitic Anhydride | 26.79 |
| 5. | Butyl Cellosolve | 14.60 |

Compounds 1–3 were charged to a reactor and heated to 400° F. The reaction was held at 400° F. for an acid number of less than 5. The reaction was then cooled to 360° F. and compound No. 4 was added. The temperature was then slowly increased to 365° F. and held for an acid number of 50–55. The heat was then reduced to 325° F. and the product quenched with 5 (butylcellosolve).

EXAMPLE VI

Comparative Example

The polyester prepared in Example V was neutralized with ammonia and reduced to 50% total nonvolatiles with water. The neutralized and reduced resin solution (100 grams) was then mixed with 7.4 parts Cymel 303 to form the coating solution. This gives a polyester/melamine ratio of 87/13. The coating solution was then applied to panels (tinplate) and baked at 400° F. for 10 minutes. When subjected to steam processing in a retort at 250° F. and 15 psi gauge the coatings softened and blushed.

EXAMPLE VII

A water reducible polyester modified with the epoxy based polyol from Example I was prepared rom the following:

|   |   | Weight |
|---|---|---|
| 1. | Pelargonic Acid | 15.57 |
| 2. | Polyol from Ex. I | 12.62 |
| 3. | Neopentyl Glycol | 26.16 |
| 4. | Trimellitic Anhydride | 21.00 |
| 5. | Isophthalic Acid | 5.79 |
| 6. | Butyl Cellosolve | 18.86 |

The polyol (No. 2) was first reacted with the pelargonic acid to an acid No. less than 3 to reduce functionality and to reduce the potential for gellation. Compounds 1–3 were charged to a reactor and heated to 375° F. The reaction was held at 375° F. for acid number less than 5. The reaction was then cooled to 320° F. and No. 4 and No. 5 added. The reaction was then heated to 410° F. and held for an acid number of 50–55. The reaction was then quenched with No. 6. Because of the higher viscosity of the polyester containing the epoxy polyol, the resin was reduced to 80% total non-volatiles with the solvent. The polyester was then neutralized with ammonia and reduced to 50% total non-volatiles with water. 100 Grams of the 50% solution were mixed with 7.4 parts Cymel 303 (87/13 polyester/melamine) and flow coated to a tinplate. When baked at 400° F. for 10 minutes and subjected to steam processing at 250° F. and 15 psi for 30 minutes the film remained unchanged and exhibited excellent adhesion to the tinplate.

We claim:

1. A water reducible polyester which is the esterification reaction product of:
   (A) a resinous polyol made by reacting one mole of an epoxy resin containing two epoxide groups per molecule with two moles of a bis-phenol wherein said resinous polyol has an oxirane content of about 0% and at least 4 hydroxyls/mole;
   (B) a monomeric polyol containing 2 to 4 hydroxyl groups and 2 to 8 carbon atoms; or a combination of polyols;
   (C) alkenoic or alkanoic acid(s) containing 8 to 18 carbon atoms;
   (D) di- or tri-functional carboxyl acids
   wherein (A) on an equivalent weight basis and (B) are mixed and then reacted with (C) and the resulting product is then reacted with (D); the acid number of the final product is 20 to 80; and said polyester is soluble in water as its alkali or amine salt.

2. A water reducible polyester according to claim 1 wherein the acid number is 50–55.

3. A water reducible polyester which is the esterification reaction product of:
   (A) 12.62 parts of a resinous polyol made by reacting one mole of an epoxy resin containing two epoxide groups with two moles of a bis-phenol wherein said resinous polyol has an oxirane content of about 0% and at least 4 hydroxyls/mole;
   (B) 26.16 parts of neopentyl glycol;
   (C) 15.57 parts of pelargonic acid and
   (D) polycarboxylic acids consisting of 21.00 parts trimellitic anhydride and 5.79 parts of isophthalic acid and
   wherein (A) and (B) are reacted with (C) to acid number less than 10 and the resulting product is then reacted with (D) to acid number 50–55 to obtain a polyester that is soluble as the ammonia or amine salt in water.

4. A coating composition for metal surfaces that provides coatings which will withstand steam processing at 250° F. for 30 minutes, said coating composition comprised essentially of an aqueous solution of
   (A) 70 to 90% of an amine salt of the polyester defined by claim 1 and
   (B) 10–30% of a cross-linking agent.

5. The coating composition according to claim 4 wherein the cross-linking agent is a water-soluble melamine formaldehyde resin.

6. A coating composition for metal surfaces that provides coatings which will withstand steam processing at 250° F. for 30 minutes, said coating composition comprised essentially of an aqueous solution of
   (A) 70–90% by weight of an amine salt of the polyester defined by claim 3 and
   (B) 10–30% by weight of water soluble melamine formaldehyde resin.

* * * * *